C. M. CONRADSON.
HYDRAULIC VARIABLE SPEED TRANSMISSION.
APPLICATION FILED FEB. 3, 1914.

1,256,501.

Patented Feb. 12, 1918.
5 SHEETS—SHEET 1.

C. M. CONRADSON.
HYDRAULIC VARIABLE SPEED TRANSMISSION.
APPLICATION FILED FEB. 3, 1914.

1,256,501.

Patented Feb. 12, 1918.
5 SHEETS—SHEET 5.

WITNESSES

INVENTOR
CONRAD M. CONRADSON
BY
ATTORNEYS

UNITED STATES PATENT OFFICE.

CONRAD M. CONRADSON, OF MADISON, WISCONSIN.

HYDRAULIC VARIABLE-SPEED TRANSMISSION.

1,256,501.  Specification of Letters Patent.  Patented Feb. 12, 1918.

Application filed February 3, 1914. Serial No. 816,173.

*To all whom it may concern:*

Be it known that I, CONRAD M. CONRADSON, citizen of the United States, resident of Madison, county of Dane, State of Wisconsin, have invented certain new and useful Improvements in Hydraulic Variable-Speed Transmission, of which the following is a specification.

The object of my invention is to provide a gearless variable speed transmission capable of use on power propelled vehicles of various types and particularly designed for automobiles or other motor vehicles.

A further object is to provide a transmission having the functions of a differential and adapting itself automatically to the varying speeds of the vehicle carrying wheels.

A further object is to provide a transmission which can be easily and quickly controlled from the driver's seat.

A further object is to provide a hydraulic transmission of simple construction and one which will be reliable and durable in its operation.

Other objects of the invention will appear from the following detailed description.

The invention consists generally in various constructions and combinations, all as hereinafter described and particularly pointed out in the claims.

In the accompanying drawings forming part of this specification.

Figures 1, 2:
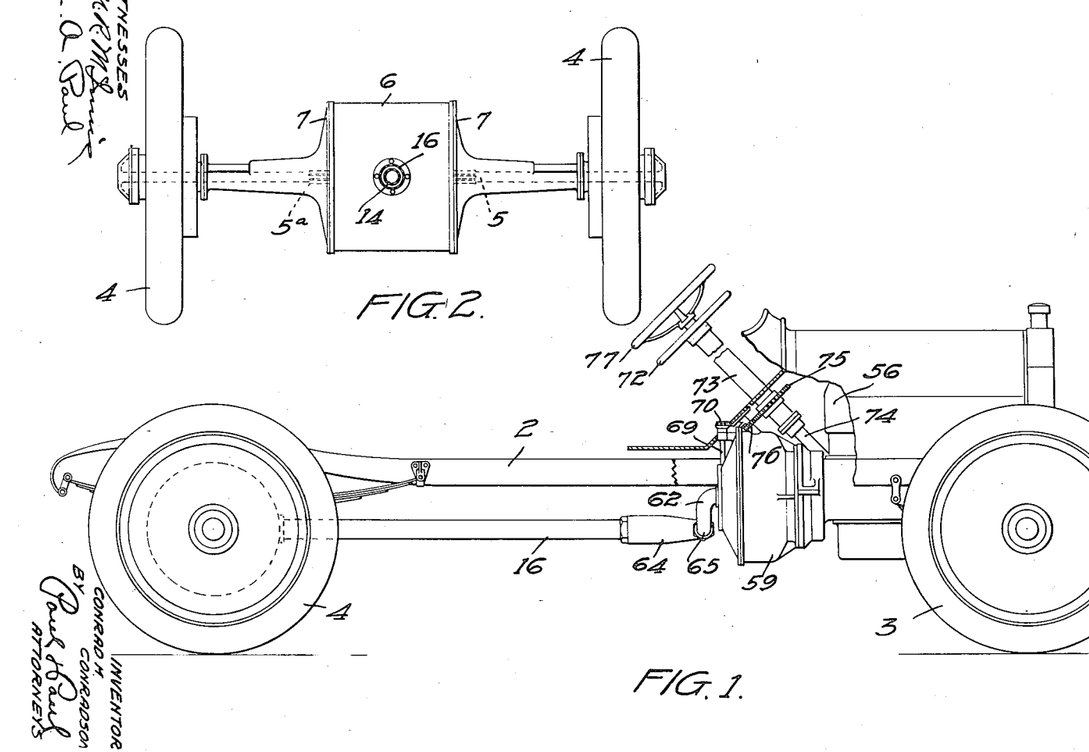
Figure 1 is a side elevation of an automobile chassis with my invention applied thereto.
Fig. 2 is a rear end view of the same.
Figure 3:
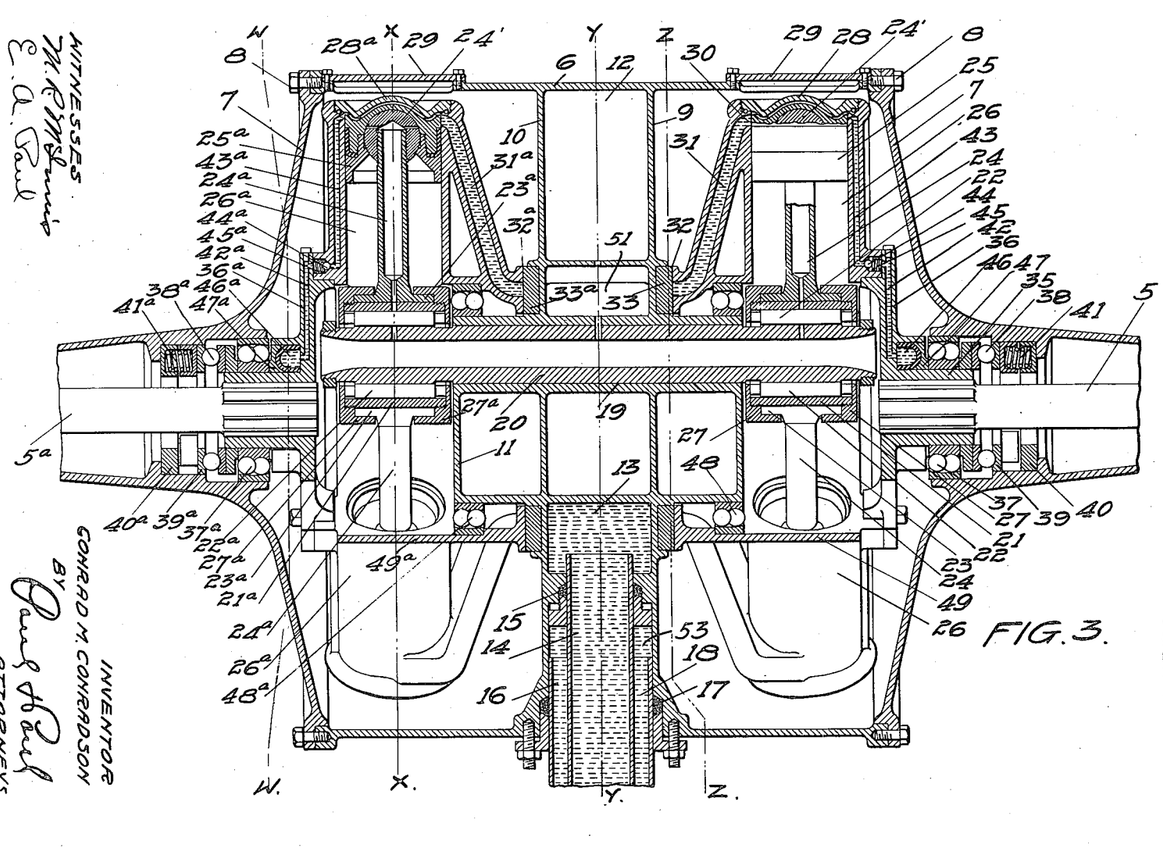
Fig. 3 is a vertical sectional view through the rear axle transmission.
Figure 4:
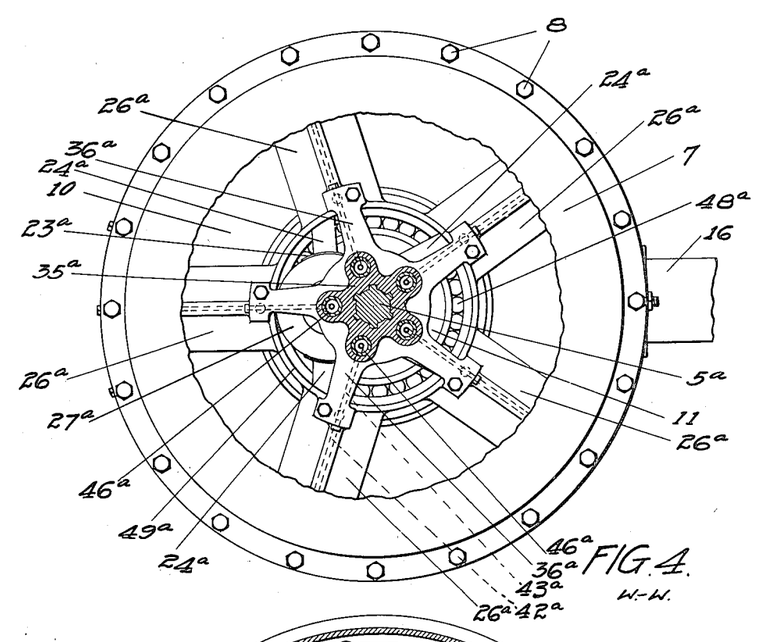
Fig. 4 is a sectional view on the line $w$—$w$ of Fig. 3.
Figure 5:
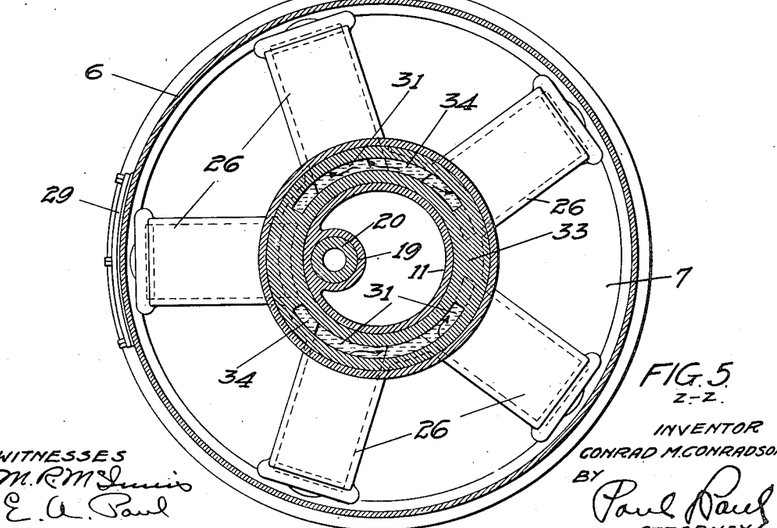
Fig. 5 is a sectional view on the line $z$—$z$ of Fig. 3.

In the drawings, 2 represents the chassis of the car, having forward and rear carrying wheels 3 and 4. Referring now to Fig. 3, 5 represents the axle section on one end of which the carrying wheel for that side is mounted. A similar axle section on the other side I will designate by the reference numeral $5^a$. The housing for the transmission comprises preferably a middle portion 6 and heads 7 mounted upon the axle sections and secured by suitable means, as bolts 8, to the middle portion. Within the housing I provide transverse walls 9 and 10, spaced apart and having a centrally arranged hub 11 that is concentric with the axle sections. Between the walls 9 and 10 an annular chamber 12 is formed, and within the chamber 12 and encircled thereby is a chamber divided by a partition 12' into an inlet chamber 13 and an outlet chamber 13'. A pipe 14 projects through the wall of the housing into the inlet chamber 13 to supply an inelastic fluid, such as oil, thereto, as will hereinafter appear, and said pipe has a rotary movement in a suitable packing 15 interposed between it and the walls 9 and 10. A second pipe 16 is concentric with the pipe 14 and incloses the same and is spaced therefrom, and communicates with the outlet chamber 13', a packing 17 allowing rotary movement of the pipe 16, an annular passage 18 being formed between the pipes through which the inelastic fluid may flow outwardly from the chamber 13'. This rotary movement of the pipes in the housing will prevent damage or breakage of the connections which might result from rocking or twisting of the car. When the driving mechanism is set for reverse movement, the flow of the inelastic fluid through the pipes 14 and 16 will be correspondingly reversed, while normally the inner pipe will conduct the flow of the fluid for straight ahead movement and the outer pipe for the return flow.

Upon opposite sides of the division plates 9 and 10 I arrange the transmission mechanism, or the means through which the power is transmitted to the axle sections to drive the machine. These mechanisms are substantially the same in construction and operation, and I will therefore describe one of them, indicating the other by the same reference numerals with the addition of the exponent "a".

Figure 7:
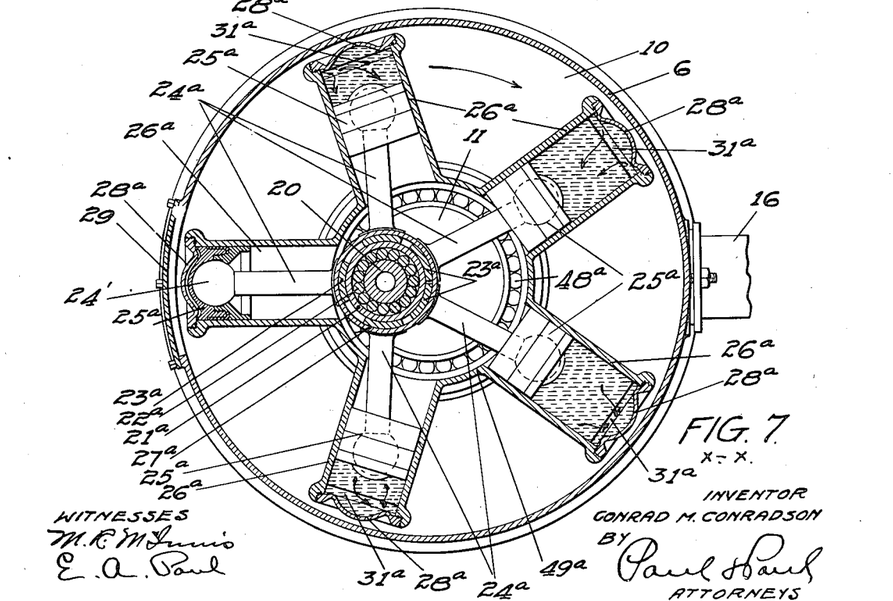
Fig. 7 is a sectional view on the line $x$—$x$ of Fig. 3.

The hub 11 has an opening 19 therein extending from end to end, eccentrically arranged with respect to the center of the housing and the axle sections and adapted to receive a preferably hollow crank pin 20. The hollow crank pin not only reduces weight, but is adapted, through the ports therein, for feeding oil to the moving parts of the mechanism. A ring 21 encircles this pin and anti-friction rolls 22 are interposed between said ring and shaft, said ring forming bearings for segments 23 provided at the inner ends of piston rods 24 having pistons 25 at their outer ends in cylinders 26. The outer ends of the piston rods 24 preferably have ball and socket bearings 24' in the pistons 25, said bearings allowing the piston rods to swing and accommodate themselves to the position of the cylinders with respect to the pin 20. The piston heads are preferably formed in two parts, separated by a suitable packing. The segments 23 are held in place on the ring by suitable locking rings 27. There are preferably five of these cylinders, as indicated in Fig. 7, arranged in groups upon each side of the middle portion of the housing. The cylinders are of the same size and there are the same number in the two groups mounted on the opposite ends of the crank pin 20. Each cylinder has a removable head 28 that is accessible through an opening 29 in the housing. Each cylinder is provided at its outer end with a port 30 communicating with a duct 31 which has a bearing surface 32 on a stationary ring 33, mounted in the wall 9 and encircling the hub 11 and provided with slots 34 which communicate successively with the ducts 31 as the cylinders 26 are revolved. These slots 34 are arranged at intervals in the ring 33 and communicate with the chamber 13 to receive the inelastic fluid discharged from the pipe 14 or return this fluid to the pipe 16. A hub 35 is secured on the axle section 5 and has a series of spider arms 36 to which the cylinders 26 are secured. The hub 35 has an anti-friction bearing 37 in the housing and a thrust bearing 38 is also provided between the bearing 37 and a ring 39, between which and a ring 40 of the housing compression springs 41 are arranged. The spider arms are provided with ducts 42 communicating with similar ducts 43 in the walls of the cylinders and normally separated by a valve 44 having a spring 45. The ducts 43 communicate with the end of the cylinder, and when the inelastic fluid is under compression therein it will flow down through the duct 43, the valve 44 and the duct 42 and into a cup 46 that is arranged on the hub 35, between the bearing 37 and the spider arm. These cups, there being one for each spider arm, receive the oil under compression and force the plunger 47 against the bearing 37 and thereby force the pump in the opposite direction to more firmly seat the valve surface 32 on the ring 33. I also prefer to provide a bearing 48 between a wall 49 of the cylinders and the hub 11. The hub 35 is free to slide on the axle section 5 and accommodate itself to the side strain of the wheels, preventing this strain from being transmitted to and unseating the surface 32 from the ring 33.

Figure 6:
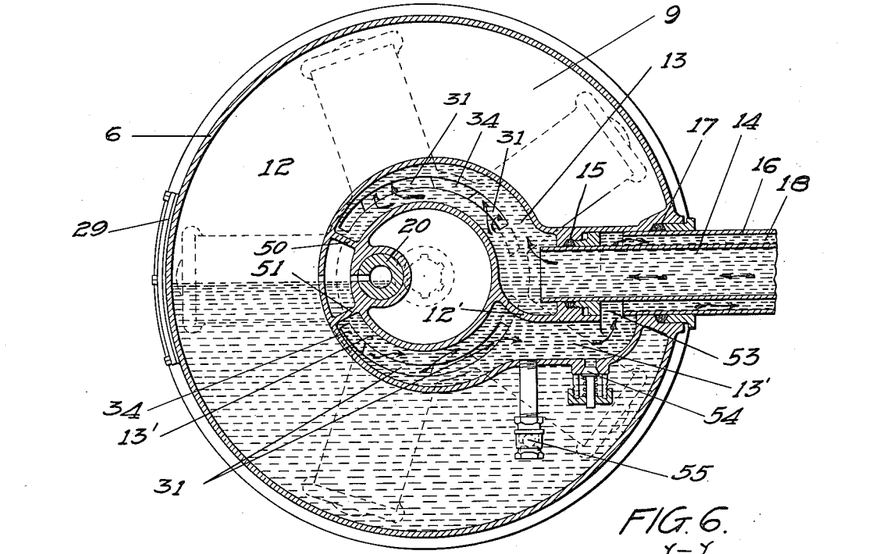
Fig. 6 is a sectional view on the line $y$—$y$ of Fig. 3.

As indicated in Fig. 6, the inner chamber is provided with partitions 50 and 51, dividing the space into an inlet chamber 13 which communicates with the pipe 14 and an outlet chamber 13', which communicates with the pipe 16. The wall 12', separating the inlet and outlet chambers from one another, is provided with a port 53 through which the inelastic fluid may flow into the pipe 16. The chambers 13 and 13', as indicated in Figs. 3 and 6, are encircled by the chamber 12 that is adapted to contain a supply of oil and a relief valve 54 is provided in the wall of the outlet chamber to allow the escape of any overplus of oil into the chamber 12 should the pressure therein become excessive, while the second valve 55 provides for the intake of oil to the outlet chamber in case the volume or pressure falls below the desired point or pipes are not full of oil. When the inelastic fluid flows into the inlet portion of the chamber 13 and from thence passes through the ducts 31 into the cylinders, the pressure on the pistons in the cylinder heads will cause rotation of the cylinders and as they revolve around their axis the pistons will be alternately moved back and forth in the cylinders to admit the oil or expel it therefrom. The movement of the pistons will be timed so that when a duct 31 is passing the inlet port of the ring 33 the passage into the cylinders will be exposed to allow the flow of the fluid therein and correspondingly all passages and ports will be opened on the return stroke of the piston to permit the expulsion of the fluid from the cylinder, the two sets or groups of cylinders operating independently of one another and evidently, if for any reason one wheel of the car is moving more rapidly than the other wheel, the group of cylinders connected with the axle of the faster running wheel will receive a greater quantity of the fluid and their pistons will operate at a correspondingly greater speed and thereby have all the functions of a differential gearing to compensate for any variation in the speed of the wheels, as in turning the machine. The device will thus not only act as a transmission between the source of power and the carrying wheels, but will automatically compensate for the difference in travel of the wheels. The inelastic fluid is free to flow equally to the cylinders of the motors, or it may flow unequally, if the capacity of one group of cylinders is greater through increase of speed than the other group. This may be a temporary condition, and when the speed of the wheels becomes uniform again the fluid will flow equally to both groups of motor cylinders.

It will be noted that the crank pin 20 of the cylinders is non-adjustable, and hence the pistons have a fixed stroke under all conditions.

As a suitable source of motive power I provide an engine 56 mounted on the forward portion of the chassis and having a driving shaft 57. (See Fig. 8). On this shaft is keyed a hub 58. A housing 59 is secured to the engine bed and spiders 60 radiate from said hub and support a group of cylinders 61. Between the housing and the spiders a thrust bearing and cups to receive the fluid pressure from ducts in the spiders are provided, of substantially the same form as heretofore described with reference to Fig. 3, and which I will designate by the same reference numerals. The cylinders have ports corresponding to those of the cylinders in Fig. 3, with ducts leading thereto from slots in a ring which I will designate by the same reference numerals, the slots in said ring communicating with pipes 62 and 63 leading to a head 64 that is pivoted at 65 and in which the concentric ends of the pipes 14 and 16 are secured. The pistons 66 in these cylinders have stems corresponding to those described and mounted in a similar manner upon a stud 67 having a T-head 68 that is provided with a threaded socket to receive a screw 69 mounted in bearings in the housing and provided with a pinion 70. The stem 67 has a radial movement in a guide 71, being actuated back and forth therein by the movement of the head 68 when the screw 69 is revolved. Any suitable mechanism may be employed for operating this T-head, but I prefer to mount a wheel 72 on a sleeve 73 that is concentric with the steering post 74, provided with a gear 75 which has a driving connection with the pinion 70 through a gearing 76. With this mechanism the driver of the car will have the wheel 72 convenient to the steering wheel 77 and whenever desired, can revolve the screw 69 and move the stem 67 toward or from the center of the driving shaft to increase or decrease the stroke of the pistons. Obviously, if the stem 67 is concentric with the driving shaft, the pistons will have no motion whatever and with their cylinders will act as a fly wheel. By shifting the stem 67 off the center of the driving shaft, the supply of inelastic fluid will be set in motion and forced through the pipe 14 to the motors and returned thereby through the pipe 16 to the cylinders 61. As before stated, the stroke of the motors is fixed, while that of the pistons 67 will be variable, and hence the driver of the car, by regulating the flow of the inelastic fluid, can easily and quickly control the speed of the car.

From the foregoing it will be noted that the two axle motors forming the differential, and the variable stroke pump connected with the source of power, have duplicate parts except for the crank pin on which the two axle motors are mounted, and that the construction is extremely simple and at the same time strong and durable and capable of withstanding the jolts and hard usage to which the transmission apparatus of an automobile is usually subjected.

Figure 8:
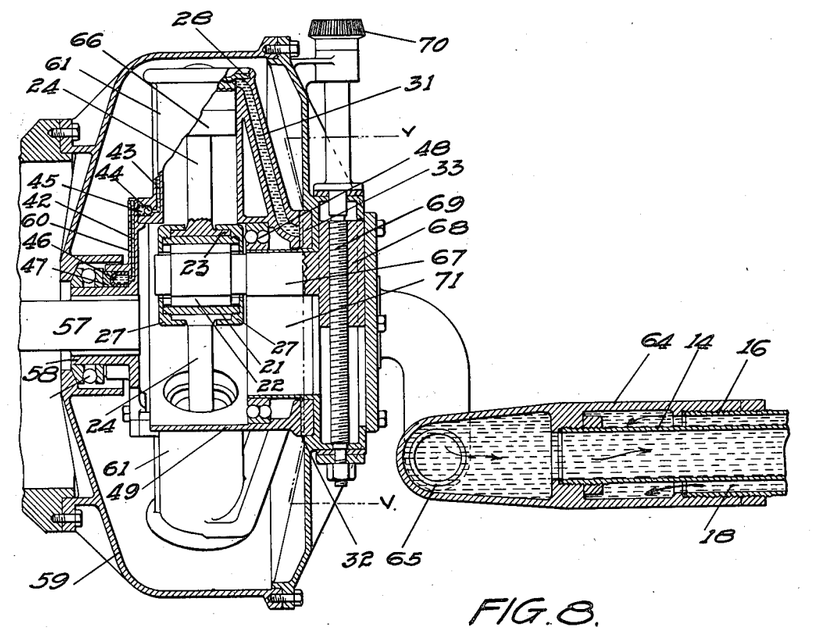
Fig. 8 is a detail sectional view illustrating the preferred form of pump for forcing the inelastic fluid through the transmission.
Figure 9:
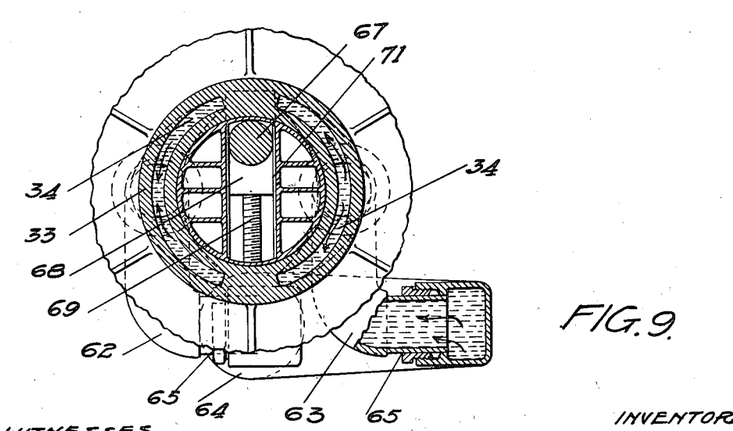
Fig. 9 is a sectional view on the line $v$—$v$ of Fig. 8.

In the operation of the apparatus, the driver of the car, if desiring to go forward, will move the T-head of the pump off the center of the drive shaft toward the position indicated in Fig. 8, whereupon the movement of the pump pistons will drive the inelastic fluid, such as oil, backwardly through the pipe 14 and into the cylinders of the motors, and returning through the pipe 16. If the car is moving straight ahead, the oil will flow equally to the cylinders of the motors, but if turning, the oil will flow unequally, one motor receiving a greater portion than the other to compensate for the difference in speed of the wheels. The degree of movement of the T-head from the center of the shaft 57 will, of course, determine the speed of the machine. Whenever desired, the T-head may be moved to the opposite side of the center of the shaft and the direction of movement of the machine will be reversed.

I claim as my invention:

1. The combination, with rear axle sections and carrying wheels, of hydraulic transmission motors operatively connected with said sections respectively, a hydraulic pump having a variable stroke and supply and return pipe connections with both of said motors, a source of motive power for said pump, said motors having ducts provided with bearing faces and pressure and exhaust chambers having slotted openings with which said ducts register as the motors revolve, and valve rings having slotted openings therein contacting with the bearing faces of said ducts.

2. The combination, with the rear axle sections and carrying wheels, of hydraulic transmission motors having fixed strokes arranged side by side and connected respectively with said sections, a hydraulic pump, supply and return pipe connections with both of said transmission motors, a hub interposed between said motors and having bearings therefor and provided with chambers communicating with said supply and return pipe connections, said motors having ducts for communication with said chambers, and a source of motive power for said pump.

3. The combination, with a vehicle chassis having forward and rear carrying wheels and rear axle sections whereon said rear wheels are mounted, a housing inclosing the abutting ends of said sections and provided with a hub concentric with said sections, motors journaled on said hub and connected with said axle sections for independent revolution, said motors having ducts communicating with chambers provided in said housing, a pump mounted on the forward portion of said chasis and means for operating said pump and pipe connections between said pump and said housing chambers.

4. The combination, with axle sections and carrying wheels, of motors mounted to revolve with said sections, each comprising a plurality of cylinders concentrically mounted with respect to said axle sections and pistons eccentrically mounted with respect to said sections, a housing for said motors having inlet and outlet chambers, a fluid supply and return pipes communicating respectively with said chambers, stationary valve rings having slotted openings therein communicating with said chambers respectively, said cylinders having fluid ducts provided with bearing faces to slide on said rings, and intake openings to communicate with said slotted openings successively as said motors revolve, and means for forcing a fluid through said pipes and cylinders to revolve said motors and said axle sections.

5. The combination, with axle sections and carrying wheels, of motors mounted to revolve with said sections and each comprising cylinders concentrically mounted with respect to said axle sections, and pistons eccentrically mounted with respect to said sections, a housing for said motors having inlet and outlet chambers, fluid supply and return pipes communicating respectively with said chambers, each of said cylinders having a fluid duct communicating therewith, rings having slotted openings communicating respectively with said chambers and successively with said ducts as said cylinders are revolved, means for forcing a fluid through said pipes and said cylinders to revolve said motors the bearings of said motors on the opposite side thereof from said fluid ducts having means communicating with said ducts for utilizing the force of the fluid to form fluid-tight joints between said rings and the inlet openings of said ducts.

6. The combination, with a housing and axle sections therein, said housing having a hub concentric with said sections, of motors splined on one side to said axle sections and having bearings on the other side on said hub and free to slide laterally for a limited distance on said axle sections, said motors comprising cylinders concentrically arranged with respect to said hub and pistons eccentrically mounted with respect thereto, said housing having inlet and outlet chambers, said cylinders having fluid ducts communicating therewith and with slotted openings leading to said chambers, fluid supply and return pipes for said chambers, and means for forcing a fluid through said pipes and chambers and said cylinders to revolve said motors.

7. The combination, with a housing and axle sections, said housing having a hub concentric with said sections, of motors journaled on said hub, hubs splined on said axle sections and having spider arms secured to said motors, said motors having cylinders concentrically mounted with respect to said hub, and pistons eccentrically mounted with respect thereto, said housing having inlet and outlet chambers and fluid supply and return pipes therefor, said cylinders having fluid supply ducts leading thereto and seats for said ducts adjacent to said chambers and provided with slotted openings communicating with said chambers, said spider arms having fluid ducts therein communicating with said cylinders and bearings for the hubs of said spider arms having cups communicating with said spider arm ducts to receive a fluid therefrom for holding said cylinder ducts against their slotted seats, and means for forcing a fluid through said pipes, said chambers, said cylinders and said ducts to revolve said chambers.

8. The combination, with a chassis having forward and rear carrying wheels and rear axle sections, and a hub concentric with said sections and provided with supply and relief chambers, motors connected with said axle sections respectively and mounted on said hub and comprising cylinders and pistons therefor, and ducts positioned to communicate with said supply and relief chambers as said cylinders are revolved, a pump mounted on the forward portion of said chassis and having pipe connections with said supply and relief chambers, and means for operating said pump.

9. The combination, with a housing having a hub therein, and inner and outer chambers encircling said hub, one of said chambers forming an inelastic fluid supply and relief chamber, the other of said chambers being divided into an inlet and an outlet chamber, supply and return pipes communicating with said inlet and outlet chambers respectively, the wall of said inner chamber having valved supply and relief ports therein, motors journaled on said hub and having cylinders concentrically arranged with respect thereto, pistons for said cylinders eccentrically arranged with respect to said hub, axle sections concentric with said hub and operatively connected with said motors, said cylinders having fluid ducts communicating with said inlet and outlet chambers successively as said motors are revolved, and means for forcing an inelastic fluid through said pipes and chambers and said cylinders.

10. The combination, with a housing, of revolving motors journaled therein, axle sections operatively connected with said motors to be revolved thereby, said housing having inelastic fluid inlet and outlet chambers communicating with said motors, supply and return pipes for said chambers respectively, means for forcing an inelastic fluid through said pipes and chambers to said motors, said pipes having a rotary movement in their bearings in said housing at one end and a pivotal connection with said forcing means at their other end.

11. The combination, with a housing, of revolving motors journaled therein, axle sections operatively connected with said motors, inelastic fluid pipes concentrically mounted in said housing at one end and communicating with said motors, said pipes being spaced apart to form a circulating passage between them and having a rotary movement in their bearings in said housing, means for forcing an inelastic fluid through said pipes and motors, said forcing means having a pivotal connection with said pipes, for the purpose specified.

12. The combination, with a chassis having forward and rear carrying wheels, axle sections for said rear wheels, revolving motors connected with said sections respectively and comprising cylinders and pistons therefor and fluid ducts leading to said cylinders, means having bearings for said motors and supply and exhaust chambers positioned to communicate with said ducts as said cylinders are revolved, fluid pressure supply and return pipes communicating with said chambers, a source of motive power mounted on the forward portion of said chassis for forcing the fluid through said pipes and motors, for the purpose specified.

13. The combination, with a chassis having forward and rear carrying wheels and rear axle sections, of motors comprising revolving cylinders and pistons therefor connected respectively with said axle sections and having fluid pressure ducts, means having fluid pressure supply and relief chambers interposed between said axle sections for communication with said fluid pressure ducts as said cylinders are revolved, a pump mounted on the forward portion of said chassis and having pipe connections with said supply and relief chambers, said pump including cylinders and pistons and means within control of the driver for varying the stroke of said pistons to increase or decrease the flow of fluid through said pipes.

14. The combination, with a housing, of revolving motors journaled therein, axle sections having carrying wheels operatively connected with said motors, inelastic fluid supply and return pipes concentrically arranged and communicating with said motors, said pipes being spaced apart to form a circulating passage between them, means for forcing an inelastic fluid through said pipes and motors, said pipes having a longitudinal and a rotary movement in their bearings, for the purpose specified.

15. The combination, with a chassis having forward and rear carrying wheels and rear axle sections, of motors mounted to revolve with said sections and comprising cylinders and pistons therefor, relatively eccentric and concentric with respect to said sections, said pistons having a fixed stroke with respect to said cylinders, a housing having fluid supply and relief chambers between said motors and said motor cylinders having fluid ducts for communication with said chambers, fluid supply and return pipes for said chambers, a pump mounted on the forward portion of said chassis and communicating with said fluid supply and return pipes, the pistons of said pump having a variable stroke, and means for shifting said pistons to increase or decrease the stroke thereof and the flow of said fluid through said pipes.

16. The combination, with a housing and axle sections therefor and a hub concentric with said sections, of motors connected with said sections and having bearings on said hub and comprising cylinders and pistons therefor, said hub having inlet and outlet chambers, said motors having fluid ducts communicating therewith and with said chambers, fluid supply and return pipes for said chambers, means for forcing the fluid through said pipes and chambers and said cylinders to revolve said motors.

17. The combination, with a housing and axle sections therein, said housing having a hub concentric with said sections, of motors operatively connected on one side to said axle sections and having bearings on the other side on said hub, said motors comprising cylinders concentrically arranged with respect to said hub and pistons eccentrically mounted with respect thereto, said housing having inlet and outlet chambers, said cylinders having fluid ducts communicating therewith and with said chambers, fluid supply and return pipes for said chambers and means for forcing a fluid through said pipes and chambers and said cylinders to revolve said motors.

18. The combination, with a housing, of revolving motors journaled therein, axle sections having carrying wheels operatively connected with said motors, fluid supply and return pipes concentrically arranged and communicating with said motors, said pipes being spaced apart to form a circulating passage between them, and means for forcing a fluid through said pipes and motors.

19. The combination, with a housing, of revolving motors journaled therein, axle sections having carrying wheels operatively connected with said motors, fluid supply and return pipes communicating with said motors, means for forcing a fluid through said pipes and motors, said pipes having a longitudinal and a rotary movement in their bearings.

In witness whereof I have hereunto set my hand this 29" day of January, 1914.

CONRAD M. CONRADSON.

Witnesses:
GENEVIEVE E. SORENSEN,
EDWARD A. PAUL.